US011772816B2

(12) United States Patent
Brown et al.

(10) Patent No.: US 11,772,816 B2
(45) Date of Patent: Oct. 3, 2023

(54) METHODS AND APPARATUS TO RECOVER UNMANNED AERIAL VEHICLES WITH KITES

(71) Applicant: Insitu, Inc., Bingen, WA (US)

(72) Inventors: Benjamin T. Brown, Hood River, OR (US); Alice E. Fockele, Portland, OR (US); Jesse D. Kiewit, Bingen, WA (US); Jacob S. Allen, Hood River, OR (US); John R. Wong, Klickitat, WA (US); Kelly A. Comstock, Carson, WA (US); Daniel L. Shaw, White Salmon, WA (US)

(73) Assignee: INSITU, INC., Bingen, WA (US)

( * ) Notice: Subject to any disclaimer, the term of this patent is extended or adjusted under 35 U.S.C. 154(b) by 0 days.

(21) Appl. No.: 17/365,742

(22) Filed: Jul. 1, 2021

(65) Prior Publication Data

US 2023/0002076 A1    Jan. 5, 2023

(51) Int. Cl.
  *B64C 31/06* (2020.01)
  *B64F 1/02* (2006.01)
  *B64C 39/02* (2023.01)

(52) U.S. Cl.
  CPC ............ *B64F 1/0295* (2020.01); *B64C 31/06* (2013.01); *B64C 39/022* (2013.01)

(58) Field of Classification Search
  CPC ...... B64F 1/0295; B64C 31/06; B64C 39/022
  See application file for complete search history.

(56) References Cited

U.S. PATENT DOCUMENTS

| | | | | |
|---|---|---|---|---|
| 4,753,400 | A * | 6/1988 | Reuter | B64F 1/027 244/116 |
| 6,264,140 | B1 * | 7/2001 | McGeer | B64F 1/0295 244/116 |
| 6,874,729 | B1 * | 4/2005 | McDonnell | B64F 1/10 244/63 |
| 7,114,680 | B2 * | 10/2006 | Dennis | B64F 1/06 244/110 E |
| 11,008,101 | B2 * | 5/2021 | Miller | B64D 1/22 |
| 2005/0017129 | A1 * | 1/2005 | McDonnell | B64F 1/02 244/110 G |
| 2007/0108345 | A1 | 5/2007 | McDonnell | |
| 2015/0360797 | A1 * | 12/2015 | Melish | B64F 1/025 244/110 C |
| 2016/0375981 | A1 * | 12/2016 | McDonnell | B64F 1/029 244/13 |
| 2017/0320592 | A1 * | 11/2017 | Chen | B64F 1/0295 |
| 2018/0312264 | A1 | 11/2018 | Cook et al. | |
| 2019/0071176 | A1 * | 3/2019 | von Flotow | B64U 70/80 |
| 2019/0337638 | A1 * | 11/2019 | Dennis | B64F 1/029 |

(Continued)

OTHER PUBLICATIONS

European Patent Office, "Extended European Search Report," issued in connection with European Application No. 22182487.3, dated Oct. 27, 2022, 10 pages.

*Primary Examiner* — Tye William Abell
(74) *Attorney, Agent, or Firm* — HANLEY, FLIGHT & ZIMMERMAN (57) ABSTRACT

Methods and apparatus to recover unmanned aerial vehicles with kites are disclosed. A disclosed example apparatus includes a tether line to be supported by a kite at a distal end thereof, and a release to deploy and expand a parafoil from at least one of the tether line or the kite in response to the aircraft contacting the tether line.

20 Claims, 7 Drawing Sheets

(56) References Cited

U.S. PATENT DOCUMENTS

2019/0337640 A1* 11/2019 Dennis .................. B64D 25/06
2020/0369406 A1* 11/2020 Von Flotow .......... B64F 1/0295
2021/0147081 A1   5/2021 McDonnell
2021/0171216 A1*  6/2021 Brown .................. B64C 39/024
2021/0171217 A1*  6/2021 Brown .................. B63G 11/00

* cited by examiner

METHODS AND APPARATUS TO RECOVER UNMANNED AERIAL VEHICLES WITH KITES

FIELD OF THE DISCLOSURE

This disclosure relates generally to aircraft and, more particularly, to methods and apparatus to recover unmanned aerial vehicles.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus to recover an aircraft includes a tether line to be supported by a kite at a distal end thereof, and a release to deploy and expand a parafoil from at least one of the tether line or the kite in response to the aircraft contacting the tether line.

An example recovery device includes a tether line, a kite to be coupled to the tether line, the kite to support the tether line when the kite is deployed, a parafoil to be stored in or proximate the tether line in an undeployed state thereof, and a release to deploy the parafoil from the tether line in response to an aircraft contacting the tether line.

An example method to recover an aircraft includes launching a kite to support a tether line, the tether line carrying a parafoil, and deploying, via a release, the parafoil in response to contact of the aircraft with the tether line.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Methods and apparatus to recover unmanned aerial vehicles (UAVs) with kites are disclosed. Some UAVs are recovered by recovery systems, which employ a recovery tether line that is suspended vertically. In particular, a UAV contacts and/or impacts the tether line and, as a result, the UAV is decelerated and/or stopped from flight, thereby enabling recovery of the UAV without need for a runway. In some known implementations, a parachute or support beam or movable boom is used to suspend the tether line for recovery of the UAV.

Examples disclosed herein enable an effective and relatively low cost recovery of an aircraft (e.g., a UAV) via a stationary platform or a moving vehicle or vessel (e.g., a ship, etc.). According to examples disclosed herein, multiple parafoils (e.g., parafoil kites) extend from a boat or a stationary platform. In particular, a kite generates lift to support and/or suspend a tether line carried by a vessel while a parafoil operatively coupled to the tether line is deployed, thereby enabling controlled deceleration of the aircraft. In other words, the kite supports and/or suspends the tether line while the parafoil decelerates the aircraft. The parafoil can be implemented as a kite, parasail or parachute, for example. Further, the aforementioned tether line can be operatively coupled to a tension device (e.g., a tensioner, a winch, a motorized winch, etc.). The tension device is implemented to retrieve the tether line along with the kite and the aircraft.

According to examples disclosed herein, the kite supports the tether line and the parafoil is deployed and/or launched from the tether line in response to the aircraft contacting and/or impacting the tether line. For example, an impact of a wing (e.g., a distal portion of a wing) with the tether line causes a release to launch/deploy the parafoil away from the tether line. In turn, the parafoil expands and/or unfolds as it is deployed from the tether line. In some examples, the parafoil is propelled and/or pushed away from the tether line. The release can include at least a frangible portion (e.g., a breakable section, a portion prone to fracturing) that breaks (e.g., fractures, bends, etc.) when the wing impacts and/or pulls on the tether line.

In some examples, a tensioner is operatively coupled to the tether line and/or the release. In some examples, the release includes and/or is operatively coupled to a bag utilized to enclose and/or restrain the parafoil when the parafoil is folded and stowed. In some examples, the bag is moved away from and/or slid away from the parafoil upon movement of the tether line and/or impact of the aircraft with the tether line. In some examples, a spring or other energy storage device is implemented to propel and/or launch the parafoil away from the tether line in response to the aircraft contacting the tether line. In some examples, a shape of the kite is altered and/or changed in response to the aircraft contacting the tether line and/or the parafoil being deployed. In some such examples, the kite is converted to a trailing edge device.

As used herein, the term "parafoil" refers to a nonrigid airfoil flight structure. Accordingly, the term "parafoil" can refer to a kite, a parachute, a parasail, a glider, any similar type of flight structure to the aforementioned examples, or a combination of any similar type of flight structures.

Figure 1:
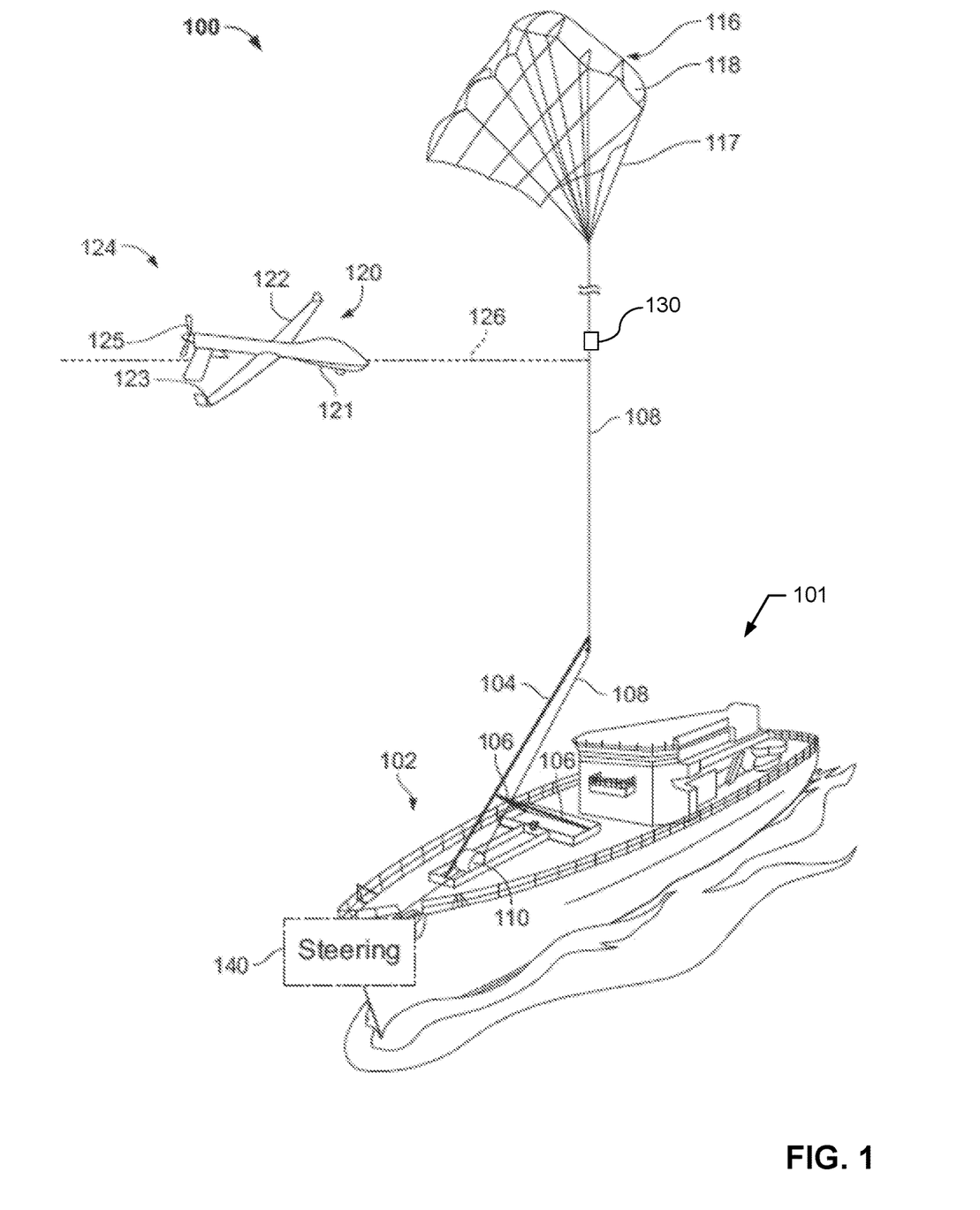
FIG. 1 depicts an unmanned aerial vehicle (UAV) recovery system in accordance with teachings of this disclosure.

FIG. 1 depicts a UAV recovery system 100 in accordance with teachings of this disclosure. The UAV recovery system 100 of the illustrated example is implemented on a vessel 101 and includes a tether line control mount 102, which includes a boom (e.g., a lower tether boom, a rotatable boom, a swivel boom, a pivoting boom, etc.) 104 and boom supports 106. In the illustrated example, a tether line 108 extends from the tether line control mount 102 while a tensioner or tension device 110, which is implemented as a winch in this example, is operatively coupled to the tether line 108. Further, the tether line 108 is operatively coupled to a kite (e.g., a parafoil kite, a drogue kite, a first kite, etc.) 116 having support lines (e.g., kite lines, foil lines, etc.) 117 and a foil (e.g., a lift foil, a lift generation foil, a kite body) 118. The UAV recovery system 100 of the illustrated example is implemented to capture an aircraft 120, which is a UAV in this example. In other examples, the aircraft 120 may be implemented as another type of aircraft (e.g., a manned aircraft), spacecraft, etc.

The example UAV 120 includes a fuselage 121, wings 122 each of which includes a distal capture portion 123, and a propulsion system 124 with propellers 125. In this example, the distal capture portion 123 extends from at least one of the corresponding wings 122 generally along a direction of movement of the UAV 120. However, any appropriate type of capture or recovery mechanism can, instead, be implemented on any other portion and/or component (e.g., the fuselage 121) of the UAV 120. Further, any other appropriate type of propulsion of the UAV 120 can instead be implemented.

In the illustrated example of FIG. 1, the UAV recovery system 100 includes a parafoil (e.g., a second auxiliary kite, a second kite, a parasail, a parachute, etc.) 130, which is depicted as stored/stowed onto the tether line 108. As will be described below in connection with FIGS. 2A-7, the parafoil 130 is deployable from the tether line 108 and/or a release component or device operatively coupled to the tether line 108 when the UAV 120 contacts and/or impacts the tether line 108. In this example, the parafoil 130 is placed in an inline arrangement such that the parafoil 130 is positioned on the tether line 108 between the boom 104 and the kite 116.

To recover and/or capture the UAV 120 as the UAV 120 moves along a flight path 126, one of the distal capture portions 123 is brought into contact with the tether line 108. As a result, the parafoil 130 is deployed to decelerate and or control movement of the UAV 120. In turn, the UAV 120 is brought to a rest and remains attached to the tether line 108. In this example, the tether line 108 is suspended by the kite 116 as the kite 116 generates lift to support the tether line 108 in the air (e.g., substantially vertically in the air, within 5 degrees from vertical). However, in some examples, subsequent to decelerating the UAV 120 by deploying the parafoil 130, a shape and/or overall geometry of the kite 116 is changed (e.g., the kite 116 changes shape to transition to a trailing edge drag device). For example, the parafoil 130 may pull on at least a portion of the kite 116 to change a shape of the kite 116 while the parafoil 130 is deployed.

In some examples, the tensioner 110 maintains a tension of the tether line 108 extending between the tether line control mount 102 and the kite 116 within a threshold range and/or at a nominal tension value (e.g., to facilitate capture of the UAV 120 and/or release of the parafoil 130). In some examples, the kite 116 is steered to direct the tether line 108 within a requisite range of the aforementioned flight path 126 for deployment of the parafoil 130 during capture of the UAV 120. Additionally or alternatively, the kite 116 is directed toward to the flight path 126 based on a desired impact force of the tether line 108 with the distal capture portion 123. In some examples, a degree to which the parafoil 130 is expanded and/or deployed varies with a degree of impact force of the UAV 120 with the tether line 108. In some other examples, the kite 116 is coupled to and/or extends from the parafoil 130 instead of the tether line 108. In some examples, a steering device 140 is implemented to direct lateral and/or translation movement of the tether line control mount 102 and/or the kite 116.

While the example of FIG. 1 is shown in the context of the vessel 101, examples disclosed herein can be applied to any stationary or moving support structure (e.g., a vehicle).

Figures 2A, 2B, 2C:
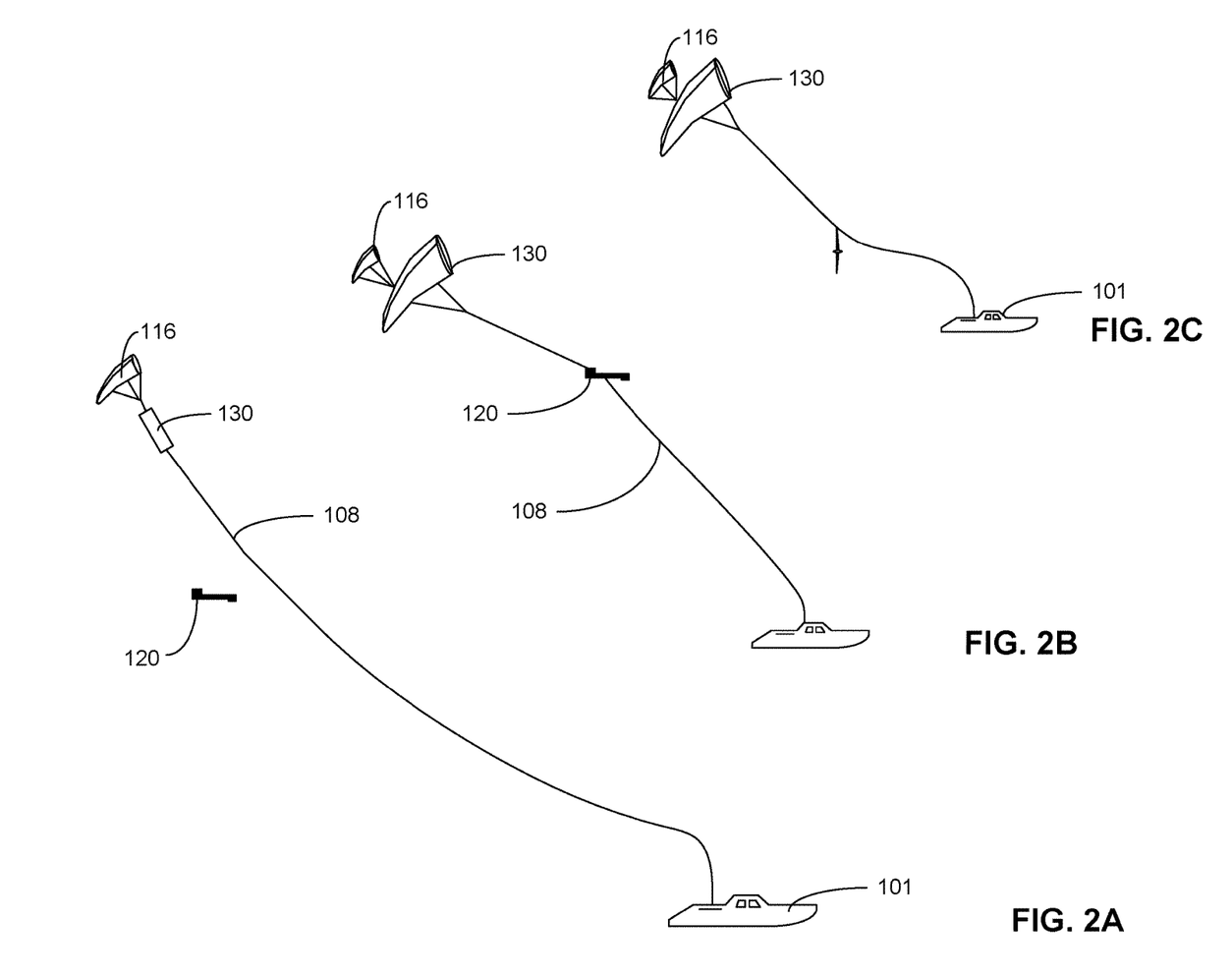
FIGS. 2A-2C depict an example recovery sequence in accordance with teachings of this disclosure.

FIGS. 2A-2C depict an example recovery sequence of in accordance with teachings of this disclosure. FIG. 2A depicts the UAV 120 approaching the tether line 108, which extends between the vessel 101 and the kite 116. In this example, the kite 116 is supporting the tether line 108 as the UAV 120 is being controlled and/or navigated to cause the distal capture portion 123 (shown in FIG. 1) of the UAV 120 to contact the tether line 108 and, thus, decelerate the UAV 120. In this example, the parafoil 130 remains undeployed and positioned on the tether line 108 proximate the kite 116. Particularly, the example parafoil 130 remains stowed and unfolded prior to being deployed.

Turning to FIG. 2B, the UAV 120 is shown in contact with the tether line 108. In this example, the distal portion 123 shown in FIG. 1 is caught on the tether line 108, thereby causing the parafoil 130 to deploy from the tether line 108. As a result, an amount of force translated to the UAV 120 is reduced. In this example, the parafoil 130 is unfolded and/or expanded during the deployment thereof, thereby decelerating the UAV 120. In this example, the kite 116 is smaller than the parafoil 130. However, in other examples, the kite 116 is larger than the parafoil 130.

FIG. 2C depicts the UAV 120 captured on the tether line 108 and being winched toward the vessel 101. In this particular example, the tension device 110 shown in FIG. 1 causes a motion (e.g., a reeling motion) of the tether line 108 and the UAV 120 toward the vessel 202 while at least one of the kite 116 and the kite 130 maintains a lift force (e.g., an upward lift force in the view of FIG. 2C) to support the tether line 108. As a result, the UAV 120 is brought onto the vessel 101.

Figure 3A:
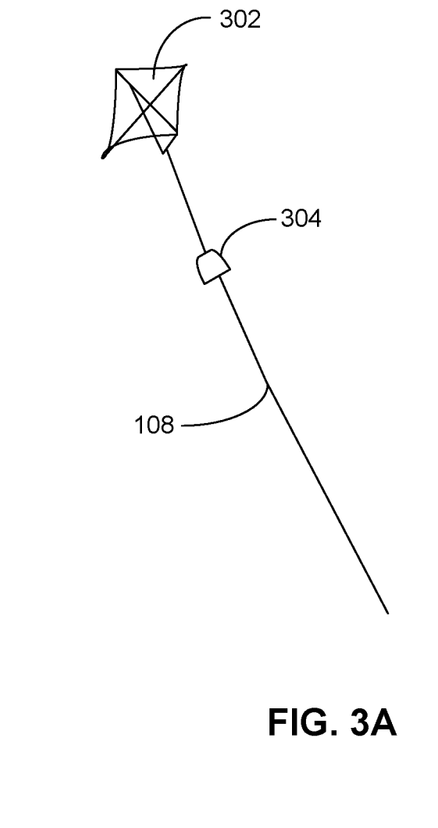
FIGS. 3A-3C depict another example recovery sequence.
Figure 3B:
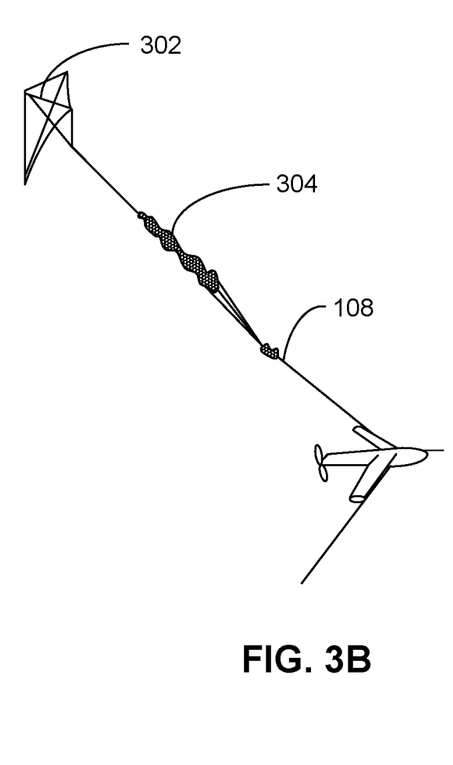
Figure 3C:
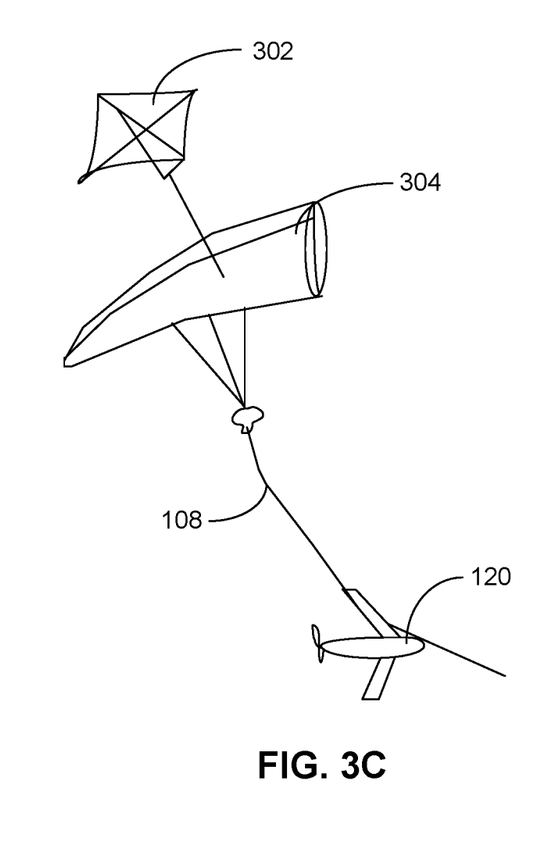

FIGS. 3A-3C depict another example recovery sequence. The example recovery sequence of FIGS. 3A-3C is similar to the example recovery sequence shown in FIGS. 2A-2C, but depicts a different kite configuration. Turning to FIG. 3A, a kite 302 is shown supporting the tether line 108 and a parafoil 304. In this particular example, the kite 302 is configured as a frame or diamond kite and the parafoil 304, which is implemented as a parafoil kite in this example, is positioned on the tether line 108 between the kite 302 and a structure holding the tether line 108, such as the vessel 101 of FIG. 1.

As can be seen in the illustrated example of FIG. 3B, the UAV 120 is depicted impacting the tether line 108. As a result of the impact between the UAV 120 and the tether line 108, the parafoil 304 begins to expand and deploy, thereby causing the kite 302 to move to a higher altitude from the ground/sea. In other words, the deployment of the kite 302 from the tether line 108 extends an effective distance from the kite 302 to the ground/sea. Additionally or alternatively, the kite 302 is coupled to the parafoil 304 instead of the tether line 108.

Turning to FIG. 3C, the parafoil 304 is depicted as fully deployed. In this example, the kite 302 continues to provide lift for the parafoil 304 as the UAV 120 is decelerated. In this example, the kite 302 also supports the tether line 108 and the UAV 120 while the tether line 108 is drawn in to recover the UAV 120 (e.g., at the vessel 101, at a ground-based station, etc.).

Figure 4A:
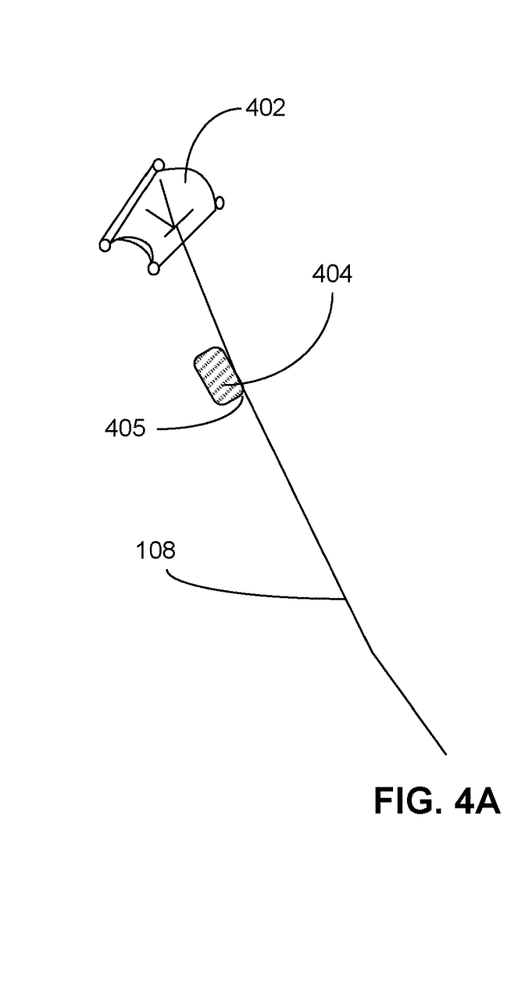
FIGS. 4A-4C depict yet another example recovery sequence.
Figures 4B, 4C:
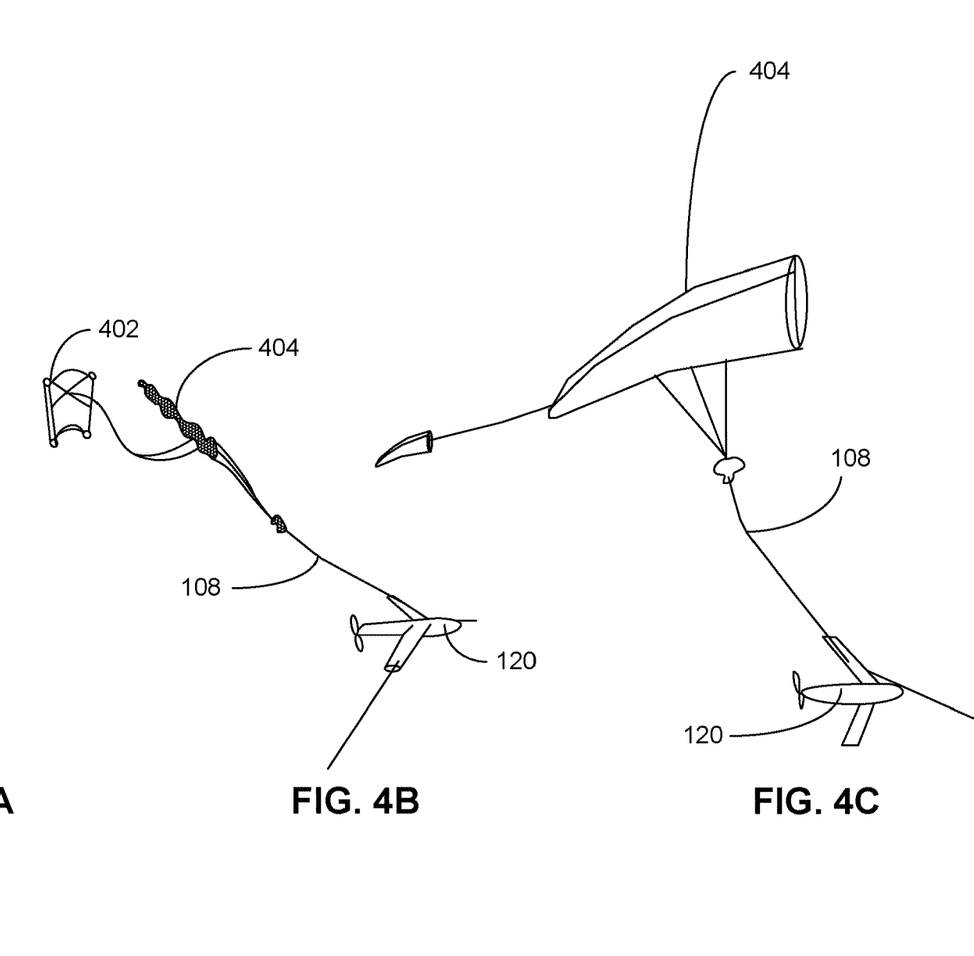

FIGS. 4A-4C depict yet another example recovery sequence. Turning to FIG. 4A, a kite 402, which is implemented as a parafoil kite or a sled kite for example, is shown supporting a parafoil 404 stowed on the tether line 108 in a bag (e.g., a parachute bag) 405. In this example, the parafoil 404 is folded while being stowed on the tether line 108.

FIG. 4B depicts the UAV 120 impacting the tether line 108 and causing the parafoil 404 to deploy to control a deceleration of the UAV 120 during recovery thereof. In some examples, the kite 402 also plays a role in decelerating the UAV 120 subsequent to impact of the UAV 120 with the tether line 108. In this example, the kite 402 extends from a portion of the parafoil 404 when the parafoil 404 is deployed. In other words, the kite 402 can be coupled to and/or attached to at least a portion of the parafoil 404.

Turning to FIG. 4C, the parafoil 404 is shown fully deployed. In this example, the kite 402 changes shape to become a trailing edge device of the parafoil 404 when the parafoil 404 is deployed. For example, the kite 402 can be folded, reshaped and or altered to a trailing edge shape upon impact of the UAV 120 with the tether line 108. In some such examples, folding of the kite 402 can result from the release of the parafoil 404 from the tether line 108 and/or a change in tension of the tether line 108.

Figure 5:
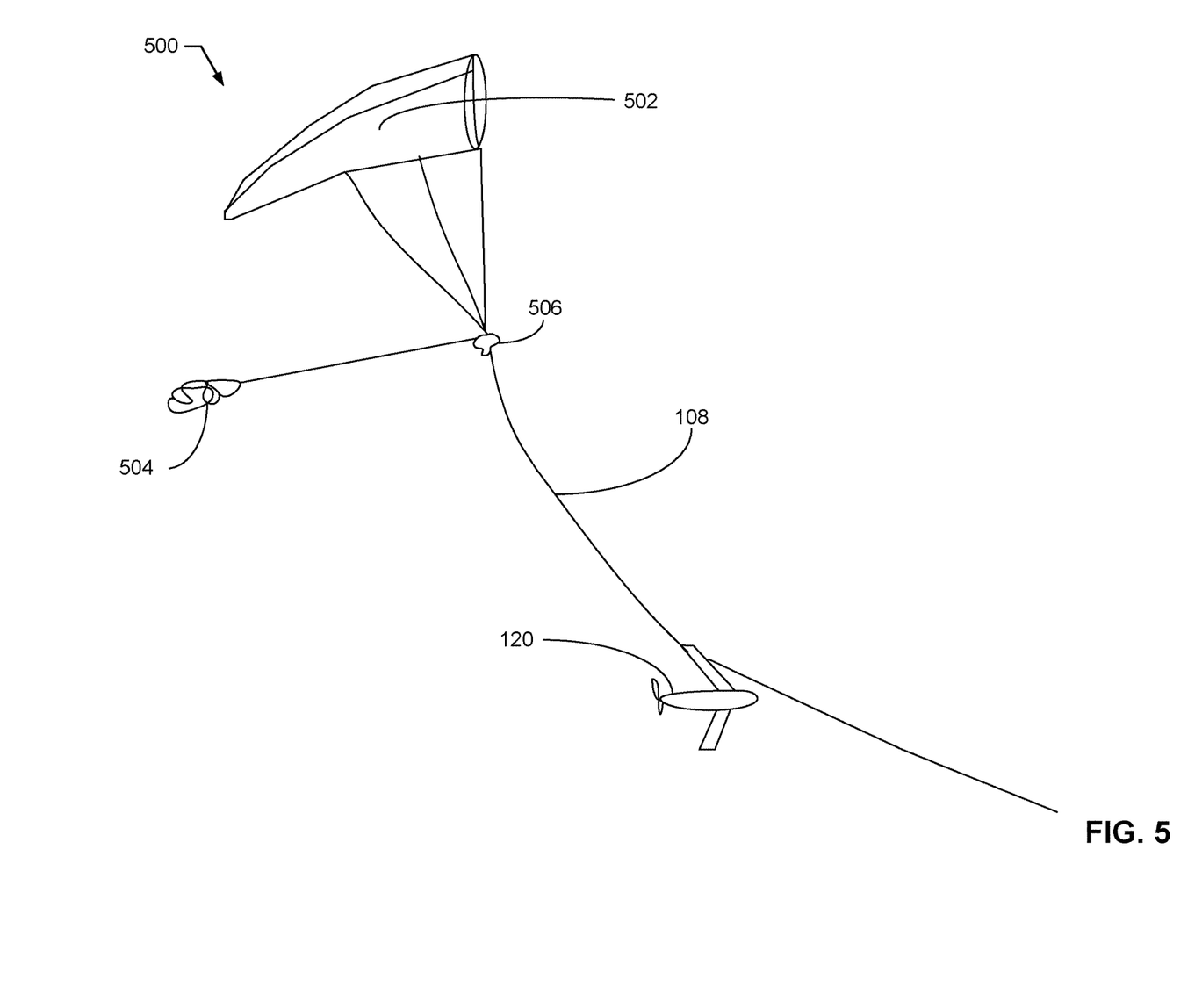
FIG. 5 depicts an example kite release system that can be implemented in examples disclosed herein.

FIG. 5 depicts an example kite release system 500 that can be implemented in examples disclosed herein. In the illustrated example of FIG. 5, a kite 502 supports the tether line 108 and is implemented as a tube kite. In the illustrated example of FIG. 5, a release assembly 506 is implemented to deploy a parafoil 504 from the tether line 108. As will be discussed in greater detail below in connection with FIG. 6, the release assembly 506 causes deployment of the parafoil 504 in response to impact of the UAV 120 with the tether line 108.

Figure 6:
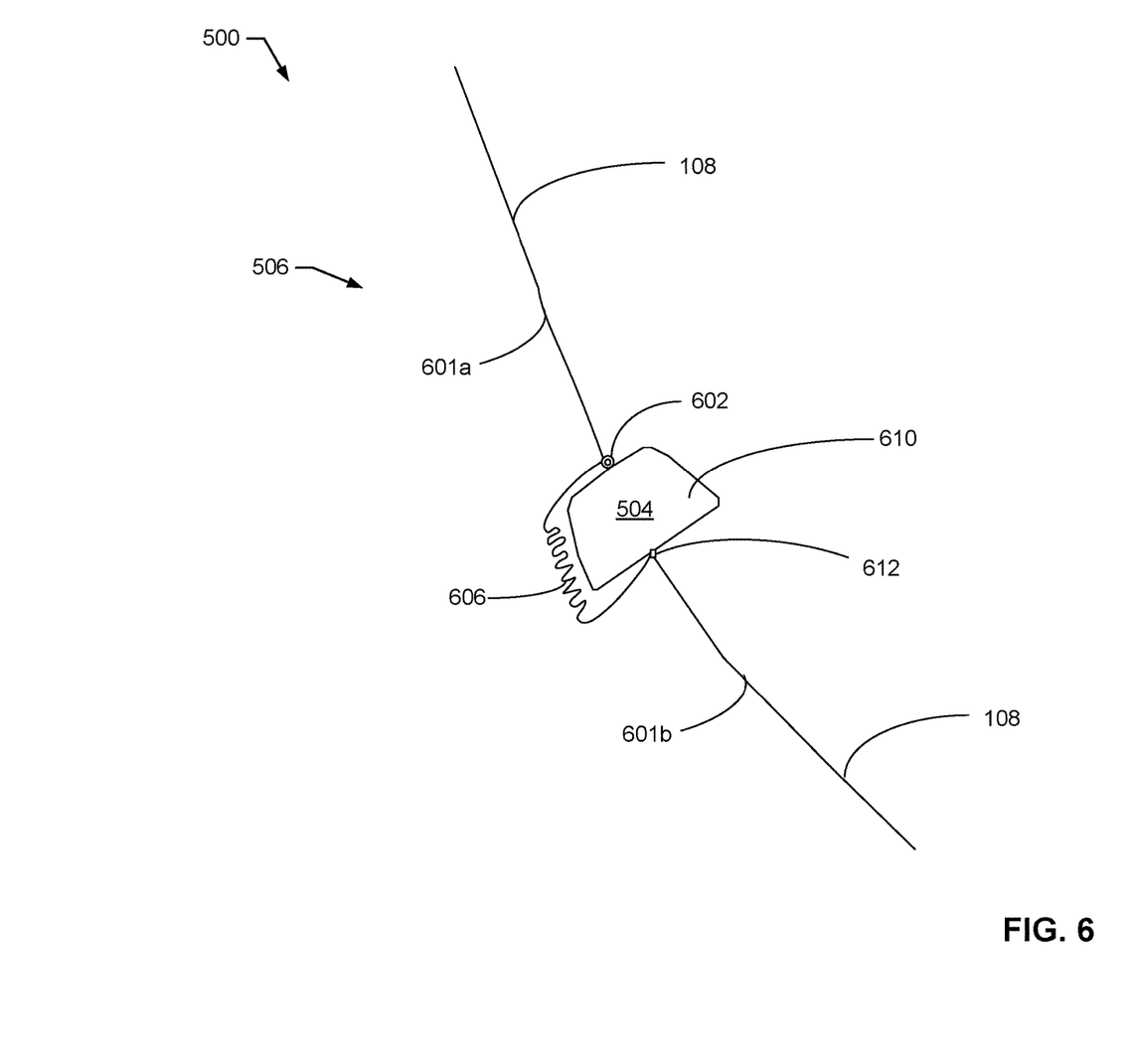
FIG. 6 is a detailed view of a portion of the example kite release system of FIG. 5.

FIG. 6 is a detailed view of a portion of the example kite release system 500 of FIG. 5. According to the illustrated example, the release assembly 506 is shown extending between an upper portion 601a and a lower portion 601b of the tether line 108. The example release assembly 506 includes a release device (e.g., a release tension device, a frangible release device, a spring-loaded release, etc.) 602 that is positioned between the upper portion 601a and a coiled portion 606 of the tether line 108. In this example, the coiled portion 606 extends between the release device 602 and the upper portion 601b of the tether line 108. In other examples, the coiled portion 606 is not part of the tether line 108. In some examples, the parafoil 504 is stowed, captivated and/or stored in a bag 610. In some examples, a spring or energy-storage device 612 is implemented.

To release and deploy the parafoil 504 when the UAV 120 impacts the tether line 108, an increase in tension (e.g., a rapid increase in tension) of the tether line 108 causes the release device 602 to open (e.g., break, unlock, etc.) and, in turn, enables the coiled portion 606 to uncoil and/or expand, thereby enabling the kite 502 of FIG. 5 to move away from the parafoil 504. As a result, the parafoil 504 is unfolded and deployed from the tether line 108. In this example, air flowing proximate to the parafoil 504 facilitates expansion and/or unfolding of the parafoil 504. Additionally or alternatively, movement and/or displacement of the bag 610 away from the parafoil 504 causes the parafoil 504 to expand, unfold and/or deploy. In some examples, the bag 610 is torn as the parafoil 504 is deployed (e.g., the bag 610 is frangible). Additionally or alternatively, the bag 610 and/or an opening of the bag 610 is widened when the parafoil 504 is being deployed to facilitate removal of the parafoil 504 therefrom. In some examples, the bag 610 is torn in response to the UAV 120 contacting the tether line 108.

In some examples, the release device 602 is frangible. For example, the release device 602 can break and/or fracture when a tension and/or force of the tether line 108 exceeds a threshold (e.g., a threshold force value). In some such examples, the release device 602 can be generally ring-shaped (e.g., an annular ring shape), for example, such that at least a portion of its ring-shape geometry can fracture when tension of the tether line 108 exceeds the threshold in response to the UAV 120 impacting the tether line 108. In some examples, movement of the tether line 108 (e.g., movement of the lower portion 601b) causes the bag 610 to separate from (e.g., slide off, slip off, uncover, etc.) the parafoil 504. In some examples, the spring or energy-storage device 612 is implemented to propel and/or launch the parafoil 504 away from the tether line 108 and/or the bag 610 in response to the UAV 120 contacting the tether line 108. In some examples, the tether line 108 and/or the coiled portion 606 is coupled to a bridle associated with the parafoil 504.

Any of the example features and/or aspects described above in connection with FIGS. 1-6 can be combined or implemented separately. In other words, the examples of FIG. 1-6 are not limiting and any aspect and/or feature of any of the examples can be utilized in combination with another aspect and/or feature.

Figure 7:
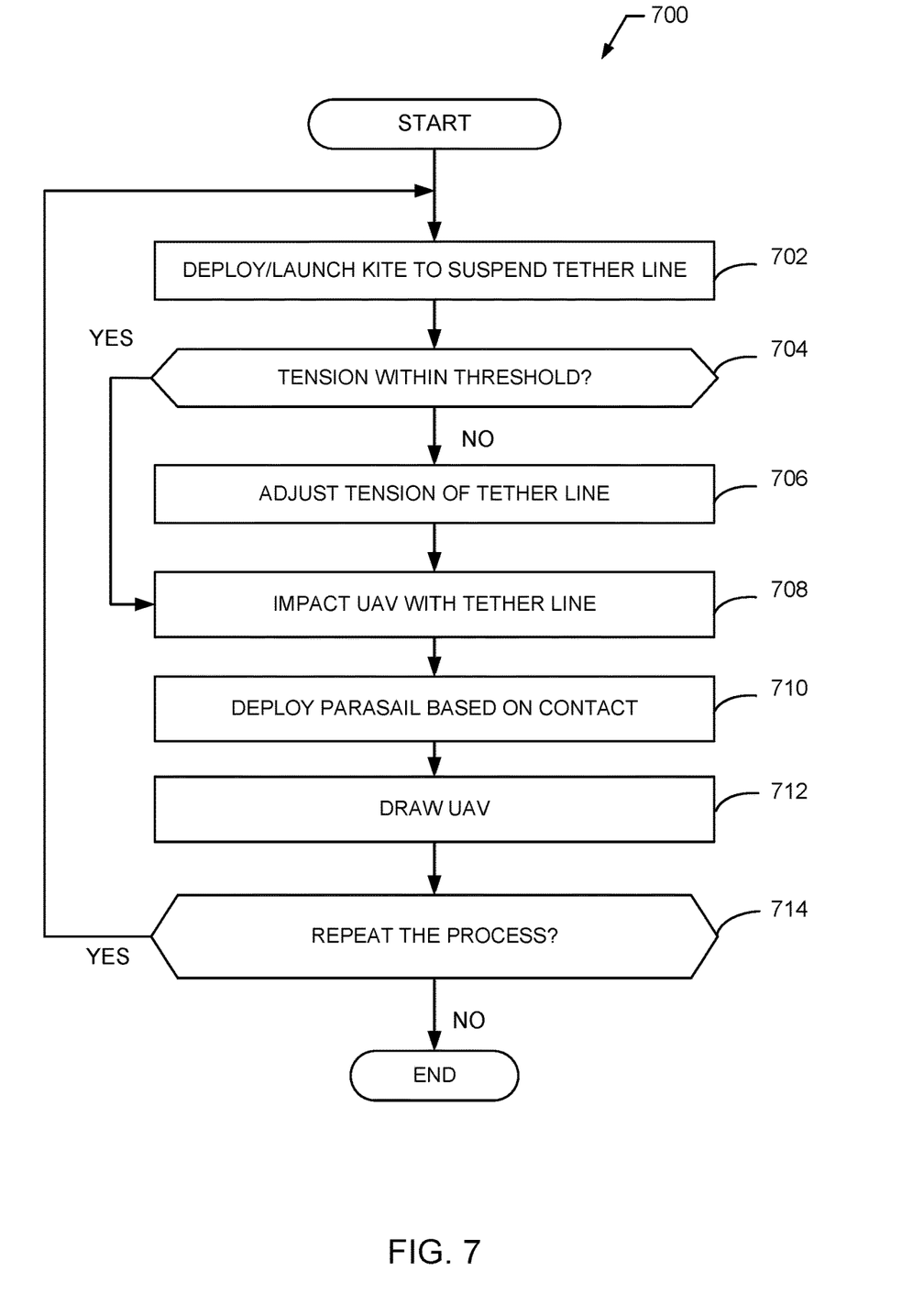
FIG. 7 is a flowchart representative of an example method to implement the example UAV recovery system of FIG. 1.

FIG. 7 is a flowchart representative of an example method 700 to implement the example UAV recovery system 100 of FIG. 1. The example method 700 begins as a kite (e.g., the kite 116, the kite 302, the kite 402, the kite 502) is about to be deployed and/or launched to support the tether line 108 from a ground-based station and/or vehicle (e.g., a land-based vehicle, a watercraft, submersible, an aircraft, a spacecraft, etc.). A parafoil (e.g., the parafoil 130, the parafoil 304, the parafoil 404, the parafoil 504) is currently stowed and folded in a compartment or other storage device (e.g., the bag 610) associated with the tether line 108.

At block 702, the kite is deployed to suspend the tether line 108. In this example, the kite is caused to hover and/or be suspended in the air at a desired height for recovery of the UAV 120 (e.g., a recovery flying altitude of the UAV 120, a height in which the UAV 120 can be recovered without significant loading and/or forces, etc.).

At block 704, in some examples, it is determined if a tension of the tether line 108 is within a threshold range or value. The threshold range or value can correspond to a release, a breakage or fracture value associated with the release device 602. For example, if the tension of the tether line 108 is within the threshold (block 704), control of the process proceeds to block 708. Otherwise, the process proceeds to block 706.

At block 706, the tension of the tether line 108 is adjusted by the tension device 110. In some examples, the tension of the tether line 108 is adjusted to an amount of tension corresponding to a working range (e.g., operating range) of the release assembly 506 and/or the release device 602. For example, the tension of the tether line 108 can be adjusted so that the UAV 120 impacting the tether line 108 can release and/or cause intended breakage of the release device 602.

At block 708, the UAV 120 is caused to impact and/or contact the tether line 108. In this example, the UAV 120 is directed to fly toward the tether line 108 so that at least a portion of the UAV 120 contacts and is captured by the tether line 108. In some examples, the UAV 120 is controlled to impact the tether line 108 at a defined speed range.

At block 710, the parafoil is deployed from the tether line 108 in response to the UAV 120 contacting/impacting the tether line 108. In some examples, the parafoil is deployed from the kite. In the illustrated example, the parafoil is deployed to facilitate deceleration of the UAV 120 in a controlled manner. In some examples, the unfolding and/or expansion of the parafoil also facilitates deceleration of the UAV 120.

At block 712, the UAV 120 is drawn via the tether line 108. In this example, the UAV 120 is drawn toward the vessel 101 for recovery of the UAV 120. In other examples, the UAV 120 is drawn toward a stationary ground-based structure on land.

At block 714, it is determined whether to repeat the process. If the process is to be repeated (block 714), control of the process proceeds to block 702. Otherwise, the process ends. This determination may be based on whether additional aircraft is to be recovered.

Example 1 includes an apparatus to recover an aircraft. The apparatus includes a tether line to be supported by a kite at a distal end thereof, and a release to deploy and expand a parafoil from at least one of the tether line or the kite in response to the aircraft contacting the tether line.

Example 2 includes the apparatus as defined in example 1, wherein the parafoil is to be at least one of expanded or unfolded when the parafoil is deployed.

Example 3 includes the apparatus as defined in any of examples 1 or 2, further including a bag to store the parafoil, the release to cause the parafoil to be removed from the bag.

Example 4 includes the apparatus as defined in example 3, wherein the release causes the bag to be torn.

Example 5 includes the apparatus as defined in any of examples 1 to 4, further including a spring to propel the parafoil from the tether line when the release deploys the parafoil.

Example 6 includes the apparatus as defined in any of examples 1 to 5, wherein the kite has a smaller size than the parafoil.

Example 7 includes the apparatus as defined in any of examples 1 to 6, wherein the release includes a frangible portion to break or fracture when the aircraft contacts the tether line.

Example 8 includes an example recovery device. The recovery device includes a tether line, a kite to be coupled to the tether line, the kite to support the tether line when the kite is deployed, a parafoil to be stored in or proximate the tether line in an undeployed state thereof, and a release to deploy the parafoil from the tether line in response to an aircraft contacting the tether line.

Example 9 includes the recovery device as defined in example 8, further including a bag operatively coupled to the tether line, the bag to store the parafoil when the parafoil is in the undeployed state.

Example 10 includes the recovery device as defined in example 9, further including a portion of the tether line that extends between first and second ends of the bag when the parafoil is undeployed.

Example 11 includes the recovery device as defined in any of examples 9 or 10, wherein an opening of the bag is to widen in response to the aircraft contacting the tether line.

Example 12 includes the recovery device as defined in any of examples 8 to 11, further including a frangible portion of the release to break upon contact of the tether line with the aircraft.

Example 13 includes the recovery device as defined in any of examples 8 to 12, wherein the kite is to change its shape in response to the parafoil being deployed.

Example 14 includes the recovery device as defined in example 13, wherein the kite is to change to a trailing edge device in response to the parafoil being deployed.

Example 15 includes a method to recover an aircraft. The method includes launching a kite to support a tether line, the tether line carrying a parafoil, and deploying, via a release, the parafoil in response to contact of the aircraft with the tether line.

Example 16 includes the method as defined in example 15, further including changing a shape of the kite in response to the contact of the aircraft with the tether line.

Example 17 includes the method as defined in example 16, wherein changing the shape of the kite includes converting the kite to a trailing edge drag device in response to the contact of the aircraft with the tether line.

Example 18 includes the method as defined in any of examples 15 to 17, wherein deploying the parafoil occurs in response to a force of the tether line exceeding a threshold force value when the aircraft impacts the tether line.

Example 19 includes the method as defined in any of examples 15 to 18, wherein deploying the parafoil includes removing the parafoil from a bag, and expanding the parafoil.

Example 20 includes the method as defined in example 19, wherein deploying the parafoil includes at least one of widening an opening of the bag or tearing the bag.

From the foregoing, it will be appreciated that example methods, apparatus and articles of manufacture have been disclosed that enable cost-effective, controlled and operator-friendly recovery of aircraft. Further, examples disclosed herein can be implemented to reduce impact and/or loading encountered by the aircraft during recovery thereof. As a result, examples disclosed herein can enable aircraft that are relatively light weight and, in turn, fuel efficient and/or low cost.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown and described in the context of UAVs, examples disclosed herein can be applied to any appropriate type of vehicle including, but not limited to, manned aircraft, spacecraft, watercraft, etc.

The following claims are hereby incorporated into this Detailed Description by this reference, with each claim standing on its own as a separate embodiment of the present disclosure.

What is claimed is:

1. An apparatus to recover an aircraft, the apparatus comprising:
   a tether line to be supported by a kite at a distal end thereof; and
   a release to deploy a parafoil from at least one of the tether line or the kite in response to the aircraft contacting the tether line, wherein the kite is to change its shape to a trailing edge device in response to the parafoil being deployed.

2. The apparatus as defined in claim 1, wherein the parafoil is to be at least one of expanded or unfolded when the parafoil is deployed.

3. The apparatus as defined in claim 1, further including a spring to propel the parafoil from the tether line when the release deploys the parafoil.

4. The apparatus as defined in claim 1, wherein the kite has a smaller size than the parafoil.

5. The apparatus as defined in claim 1, wherein the release includes a frangible portion to break or fracture when the aircraft contacts the tether line.

6. The apparatus as defined in claim 1, further including a steering device to direct motion of the kite toward a flight path of the aircraft.

7. The apparatus as defined in claim 1, wherein the kite is to change its shape by folding in response to the deployment of the parafoil.

8. The apparatus as defined in claim 1, wherein a degree to which the kite is to change its shape is based on an impact force of the aircraft with the tether line.

9. The apparatus as defined in claim 1, further including a bag to store the parafoil, the release to cause the parafoil to be removed from the bag.

10. The apparatus as defined in claim 9, wherein the release causes the bag to be torn.

11. The apparatus as defined in claim 9, wherein a coiled portion of the tether line is positioned between ends of the release prior to deployment of the parafoil via the bag.

12. A recovery device comprising:
    a tether line;
    a kite to be coupled to the tether line, the kite to support the tether line when the kite is deployed;
    a parafoil to be stored in or proximate the tether line in an undeployed state thereof; and
    a release to deploy the parafoil from the tether line in response to an aircraft contacting the tether line, wherein the kite is to change its shape to a trailing edge device in response to the parafoil being deployed.

13. The recovery device as defined in claim 12, further including a frangible portion of the release to break upon contact of the tether line with the aircraft.

14. The recovery device as defined in claim 12, further including a bag operatively coupled to the tether line, the bag to store the parafoil when the parafoil is in the undeployed state.

15. The recovery device as defined in claim 14, further including a portion of the tether line that extends between first and second ends of the bag when the parafoil is undeployed.

16. The recovery device as defined in claim 14, wherein an opening of the bag is to widen in response to the aircraft contacting the tether line.

17. A method to recover an aircraft, the method comprising:
- launching a kite to support a tether line, the tether line carrying a parafoil;
- deploying, via a release, the parafoil from at least one of the tether line or the kite in response to contact of the aircraft with the tether line; and
- changing a shape of the kite in response to the contact of the aircraft with the tether line, wherein changing the shape of the kite includes converting the kite to a trailing edge drag device in response to the contact of the aircraft with the tether line.

18. The method as defined in claim 17, wherein deploying the parafoil occurs in response to a force of the tether line exceeding a threshold force value when the aircraft impacts the tether line.

19. The method as defined in claim 17, wherein deploying the parafoil includes removing the parafoil from a bag, and expanding the parafoil.

20. The method as defined in claim 19, wherein deploying the parafoil includes at least one of widening an opening of the bag or tearing the bag.

\* \* \* \* \*